(12) United States Patent
Wang et al.

(10) Patent No.: US 12,119,965 B2
(45) Date of Patent: Oct. 15, 2024

(54) CIRCUIT STRUCTURE FOR REALIZING REAL-TIME PREDISTORTION CALIBRATION OF BROADBAND IQ MODULATION AND METHOD THEREOF

(71) Applicant: Transcom (Shanghai) Technology Co., Ltd., Shanghai (CN)

(72) Inventors: Xiaolei Wang, Shanghai (CN); Shuang Chen, Shanghai (CN)

(73) Assignee: Transcom (Shanghai Technology Co., Ltd., Shanghai (CN)

( * ) Notice: Subject to any disclaimer, the term of this patent is extended or adjusted under 35 U.S.C. 154(b) by 0 days.

(21) Appl. No.: 18/007,774

(22) PCT Filed: Jul. 29, 2020

(86) PCT No.: PCT/CN2020/105361
§ 371 (c)(1),
(2) Date: Dec. 2, 2022

(87) PCT Pub. No.: WO2021/243833
PCT Pub. Date: Dec. 9, 2021

(65) Prior Publication Data
US 2023/0224193 A1 Jul. 13, 2023

(30) Foreign Application Priority Data
Jun. 3, 2020 (CN) .......................... 202010496376.1

(51) Int. Cl.
*H04L 25/49* (2006.01)
*H04L 25/03* (2006.01)

(52) U.S. Cl.
CPC ........ *H04L 25/49* (2013.01); *H04L 25/03993* (2013.01)

(58) Field of Classification Search
CPC .. H04L 25/49; H04L 25/03993; H04B 1/0475
See application file for complete search history.

(56) References Cited

U.S. PATENT DOCUMENTS 4,617,537 A * 10/1986 Nossek ................. H04L 27/362
332/151
4,661,948 A * 4/1987 Shapiro ................. H04L 27/365
370/430

(Continued)

FOREIGN PATENT DOCUMENTS

AU 2016307964 A1 * 3/2018 ............ H02M 3/158
AU 2016307964 B2 * 7/2020 ............ H02M 3/158

(Continued)

OTHER PUBLICATIONS

V. K. Parikh, P. T. Balsara and O. E. Eliezer, "All Digital-Quadrature-Modulator Based Wideband Wireless Transmitters," in IEEE Transactions on Circuits and Systems I: Regular Papers, vol. 56, No. 11, pp. 2487-2497, Nov. 2009, doi: 10.1109/TCSI.2009.2015600. (Year: 2009).*

(Continued)

*Primary Examiner* — Berhanu Tadese
(74) *Attorney, Agent, or Firm* — MaxGoLaw PLLC (57) ABSTRACT

The present invention relates to a circuit structure for realizing real-time pre-distortion calibration of broadband IQ modulation, comprises a baseband generation module, for the calibration signal generator to generate two orthogonal sine cosine calibration signals respectively according to the calibration bandwidth and the order of the pre-distortion filter, and the data switch is switched to the relevant data channel; a digital-to-analog conversion module, for converting the signals into analog I and Q baseband signals; a frequency synthesis module, for generating signals in a certain frequency range; a IQ modulation module, for mixing the analog baseband signal with the local oscillator signal; an amplitude control module, for continuous adjustment of the RF signal power. The present invention also relates to a method for realizing real-time pre-distortion calibration processing of broadband IQ modulation. With (Continued)

the circuit structure and method of the present invention for realizing real-time pre-distortion calibration of broadband IQ modulation, the calibration process is completed locally in real time, solving the problem of frequency response error correction caused by hardware circuit performance change, so that automatic pre-distortion calibration of frequency response can be completed on site in real time.

18 Claims, 2 Drawing Sheets

(56) References Cited

U.S. PATENT DOCUMENTS

| | | | | |
|---|---|---|---|---|
| 4,843,351 | A * | 6/1989 | Edwards | H04L 27/364 375/298 |
| 5,121,412 | A * | 6/1992 | Borth | H04L 27/2007 332/104 |
| 5,216,391 | A * | 6/1993 | Shiraishi | H04L 27/2014 332/101 |
| 5,225,795 | A * | 7/1993 | Iinuma | H04L 27/2092 332/149 |
| 5,253,271 | A * | 10/1993 | Montgomery | H04L 27/365 375/295 |
| 5,432,483 | A * | 7/1995 | Maru | H04L 27/2071 375/224 |
| 5,512,865 | A * | 4/1996 | Fague | H04L 27/2092 375/283 |
| 5,767,739 | A * | 6/1998 | Witte | H04S 1/007 375/261 |
| 5,781,076 | A * | 7/1998 | Iwamatsu | H04L 27/362 375/261 |
| 5,799,038 | A * | 8/1998 | Nowara | H04L 27/2332 370/203 |
| 5,946,359 | A * | 8/1999 | Tajiri | H03C 3/40 329/304 |
| 6,188,723 | B1 * | 2/2001 | Lee | H04L 27/34 708/319 |
| 6,339,621 | B1 * | 1/2002 | Cojocaru | H04L 27/362 375/247 |
| 6,570,933 | B1 * | 5/2003 | Makinen | H04L 27/3863 375/296 |
| 6,714,601 | B2 * | 3/2004 | Makinen | H04L 27/3863 375/329 |
| 6,744,825 | B1 * | 6/2004 | Rimstad | H04L 27/206 375/243 |
| 6,862,321 | B2 * | 3/2005 | Kaneko | H04L 27/2627 375/296 |
| 7,158,581 | B2 * | 1/2007 | Weiss | H03F 1/32 375/296 |
| 7,254,189 | B1 * | 8/2007 | Kazakevich | H04L 27/2332 375/326 |
| 7,336,725 | B2 * | 2/2008 | Cova | H03F 1/3294 375/296 |
| 7,366,252 | B2 * | 4/2008 | Cova | H03F 1/3252 375/296 |
| 7,460,612 | B2 * | 12/2008 | Eliezer | H03F 3/24 375/295 |
| 7,474,693 | B2 * | 1/2009 | Busson | H04B 1/403 375/219 |
| 7,991,044 | B1 * | 8/2011 | Brown | H04L 27/0014 375/226 |
| 8,068,557 | B2 | 11/2011 | Dalipi | |
| 8,169,358 | B1 * | 5/2012 | Bourdelais | G01S 13/74 342/52 |
| 8,412,111 | B2 * | 4/2013 | Talwar | H04B 17/16 455/67.11 |
| 8,848,831 | B2 * | 9/2014 | Fratti | H04L 27/361 375/301 |
| 9,444,500 | B2 * | 9/2016 | Wang | H04B 1/0475 |
| 9,800,452 | B2 * | 10/2017 | Lehtinen | H04B 1/04 |
| 10,718,804 | B2 * | 7/2020 | Sariaslani | G01R 29/26 |
| 10,727,788 | B2 * | 7/2020 | Petrovic | H03F 1/02 |
| 2005/0157814 | A1 * | 7/2005 | Cova | H03F 1/3252 375/297 |
| 2005/0195919 | A1 * | 9/2005 | Cova | H03F 1/3294 375/297 |
| 2007/0211824 | A1 * | 9/2007 | Yamazaki | H04L 27/36 375/302 |
| 2013/0295856 | A1 * | 11/2013 | Talwar | H04B 17/16 455/67.12 |
| 2018/0241347 | A1 * | 8/2018 | Petrovic | H04B 1/0475 |
| 2023/0224193 | A1 * | 7/2023 | Wang | H04B 1/0475 375/262 |

FOREIGN PATENT DOCUMENTS

| | | | | |
|---|---|---|---|---|
| CA | 2995587 | C * | 1/2023 | H02M 3/158 |
| CA | 3141955 | C * | 9/2023 | H02M 3/158 |
| CN | 101129040 | A * | 2/2008 | H03F 1/3247 |
| CN | 101790256 | A * | 7/2010 | |
| CN | 101997664 | A * | 3/2011 | |
| CN | 101997789 | A * | 3/2011 | |
| CN | 102143108 | A * | 8/2011 | |
| CN | 102148789 | A * | 8/2011 | |
| CN | 102386894 | A * | 3/2012 | |
| CN | 202334461 | U * | 7/2012 | |
| CN | 102665229 | A * | 9/2012 | |
| CN | 103226170 | A * | 7/2013 | G01R 29/26 |
| CN | 102386894 | B * | 4/2014 | |
| CN | 102665229 | B * | 12/2014 | |
| CN | 104901368 | A * | 9/2015 | |
| CN | 104901638 | A | 9/2015 | |
| CN | 103226170 | B * | 8/2017 | G01R 29/26 |
| CN | 107947740 | A * | 4/2018 | |
| CN | 108337204 | A * | 7/2018 | H04L 27/12 |
| CN | 108463945 | A * | 8/2018 | H02M 3/158 |
| CN | 211791590 | U * | 10/2020 | H04B 1/0475 |
| CN | 108337204 | B * | 12/2020 | H04L 27/12 |
| CN | 112491766 | A * | 3/2021 | H04L 27/00 |
| CN | 214224154 | U * | 9/2021 | |
| CN | 114024627 | A * | 2/2022 | H04B 17/15 |
| CN | 114088978 | A * | 2/2022 | |
| CN | 114124248 | A * | 3/2022 | |
| CN | 108463945 | B * | 6/2022 | H02M 3/158 |
| CN | 114710122 | A * | 7/2022 | H02M 3/158 |
| CN | 112491766 | B * | 12/2022 | H04L 27/00 |
| DE | 10022853 | A1 * | 9/2001 | H03F 1/32 |
| EP | 1273098 | B1 * | 5/2004 | H03F 1/32 |
| EP | 2141806 | A1 * | 1/2010 | H03H 11/1291 |
| WO | WO-0169778 | A2 * | 9/2001 | H03F 1/32 |
| WO | WO-2017030935 | A1 * | 2/2017 | H02M 3/158 |
| WO | WO-2021243833 | A1 * | 12/2021 | H04B 1/0475 |

OTHER PUBLICATIONS

X. Wang, C. Yu, Y. Li, W. Hong and A. Zhu, "Real-Time Single Channel Over-the-Air Data Acquisition for Digital Predistortion of 5G Massive MIMO Wireless Transmitters," 2019 IEEE MTT-S International Wireless Symposium (IWS), Guangzhou, China, 2019, pp. 1-3, doi: 10.1109/IEEE-IWS.2019.8804102. (Year: 2019).*
Int'l Search Report for PCT/CN2020/105361, dated Feb. 22, 2021.

* cited by examiner

Fig. 3

# CIRCUIT STRUCTURE FOR REALIZING REAL-TIME PREDISTORTION CALIBRATION OF BROADBAND IQ MODULATION AND METHOD THEREOF

CROSS-REFERENCE TO RELATED APPLICATION

This application claims priority of Chinese Invention Patent Application No. 202010496376.1 filed Jun. 3, 2020, which is incorporated herein by reference.

FIELD OF TECHNOLOGY

The present invention relates to the field of modern digital communication, in particular to the field of vector signal generator, specifically, it refers to a circuit structure and method for realizing real-time predistortion calibration of broadband IQ modulation.

DESCRIPTION OF RELATED ARTS

Modern digital communication technology widely used IQ modulation technology, vector signal generator is widely used in the development and production of communication equipment, terminals and chips, its role is to provide standard known intense signal to measure and evaluate the response of the object under test, in order to judge whether its function and performance index meet the requirements. As a general-purpose test and measurement instrument, the vector signal generator has the characteristics of wide frequency band, large bandwidth and high performance, high performance is mainly reflected in the phase noise, power accuracy and stability, error vector magnitude (EVM) core technical indicators.

A core metric of a vector signal generator is EVM, which reflects the amplitude and phase error of the actual signal versus the ideal signal. There are various factors affecting the modulated signal EVM, including phase noise, signal-to-noise ratio, quadrature error, in-band frequency response, etc. Among them, the error of in-band frequency response has a very obvious impact in broadband IQ modulation. Nowadays, the wireless communication technology keeps developing, and the new generation of wireless communication system represented by 5G, the signal bandwidth has reached more than 100 MHz, and higher-order digital modulation, such as 64QM, is used to improve the spectral efficiency, which all put forward extremely high requirements on the EVM performance of vector signal generator. In the above schematic block diagram, the frequency response error that causes the deterioration of EVM is mainly derived from the following:
(1) Frequency response error of the baseband signal, mainly due to the broadband characteristics of the DAC and the device error of the analog filter;
(2) The broadband modulation characteristics of the modulator, mainly caused by the frequency response of the mixer and port matching error, in addition to the frequency and power change of the local oscillator signal from the frequency synthesis, will also cause the modulator frequency response to change;
(3) RF channel frequency response error, this part of the error source is the largest, mainly the broadband characteristics of various RF devices and the matching between them, will produce a large frequency response error;

To overcome the deterioration of EVM caused by frequency response errors, it is generally necessary to include a calibration function in high-performance vector signal generators that can pre-calibrate frequency response, quadrature, gain balance, etc. Specific measurement data with known states are stored and then pre-distortion is performed in the baseband generation to offset the deterioration of EVM due to back-end errors. This calibration is usually a one-time event, performed at the factory. However, there are still some problems with this calibration as follows:
(1) Calibration data is not traversable, and since the instrument has so many operating states, traversing the calibration data in various states requires a huge amount of data and work time, and is therefore impractical and unfeasible. It's generally performed by means of fitting, and the existence of errors in such fitting cannot be eliminated;
(2) The components of the RF circuit will age over time and are unpredictable; therefore, the performance of the instrument will continue to deteriorate over time, requiring return to the factory for calibration and maintenance;
(3) The performance parameters of RF devices such as modulators, amplifiers and attenuators vary unpredictably with the environment, resulting in changes in the fluctuations of frequency response.

In summary, to improve the EVM of the vector signal generator, the present invention proposes a pre-distortion calibration circuit and method with real-time feedback to solve the problem of frequency response variation and thus deterioration of EVM caused by the above problem.

SUMMARY OF THE INVENTION

The purpose of the present invention is to overcome the above-mentioned shortcomings of the prior art and provide a circuit structure and method for realizing real-time pre-distortion calibration of broadband IQ modulation that satisfies good real-time performance, easy operation, and a relatively wide range of application.

In order to achieve the above purpose, the circuit structure and method of the present invention for realizing real-time pre-distortion calibration of broadband IQ modulation is as follows:

The circuit structure for realizing real-time pre-distortion calibration of broadband IQ modulation, the main feature of which is that said circuit structure comprises:
  a baseband generation module, for the calibration signal generator to generate two orthogonal sine cosine calibration signals respectively according to the calibration bandwidth and the order of the pre-distortion filter, and the data switch is switched to the relevant data channel;
  a digital-to-analog conversion module, connected to the baseband generation module, for converting the signals into analog I and Q baseband signals;
  a frequency synthesis module, connected to the IQ modulation module, for generating signals in a certain frequency range;
  an IQ modulation module, connected to the digital-to-analog conversion module, for mixing the analog baseband signal with the local oscillator signal, and summing the output of the two mixers after combining them;
  an amplitude control module, connected to the IQ modulation module and digital-to-analog conversion module, for continuous adjustment of the RF signal power.

Preferably, the said baseband generation module comprises:

baseband generation unit for generating two orthogonal digital I and Q path signals depending on the signal regime or type;

an automatic pre-distortion calibration factor generation unit, for processing the collected frequency response data, generating a pre-distortion calibration factor, and converting this calibration factor into an h-factor for the pre-distortion filter;

pre-distortion filter, connected to the baseband generation unit, for pre-distortion of the baseband signal, loaded in real time with an automatically generated h-factor;

a calibration signal generator, for generating a digital baseband calibration signal, and two sine and cosine digital signals orthogonal to each other;

a data switch, connected to the pre-distortion filter, for switching the calibration signal and the baseband signal into the digital-to-analog conversion module.

Preferably, the said digital-to-analog conversion module comprises a digital-to-analog converter and an analog-to-digital converter, the said digital-to-analog converter is connected to the data switch, and said analog-to-digital converter is connected to the automatic pre-distortion calibration factor generation unit and the amplitude control module, for digitizing the output signal of the detector and generating the frequency response error calibration factor by calculation.

Preferably, the said amplitude control module comprising an analog voltage controlled attenuator, an amplifier, a coupler and a digital step attenuator, the said analog voltage controlled attenuator, amplifier, coupler and digital step attenuator being connected in sequence, the said input of the analog voltage controlled attenuator being connected to the IQ modulation module;

the said amplitude control module further comprising a detector, connected to the digital-to-analog converter module, an analog voltage controlled attenuator and a coupler, for detecting amplitude information of a known signal output;

the analog voltage controlled attenuator, coupler and detector described constitute a closed-loop automatic level-controlled negative feedback, for stabilizing the power output of the signal.

The method for realizing real-time pre-distortion calibration processing of broadband IQ modulation using the circuit structure described above, the main feature of which is that the said method comprises the steps of:

(1) The vector signal generator path state parameters are set to change, set whether the automatic calibration is carried out by the parameters, if yes, enter the calibration mode and continue to step (2); otherwise, enter the working mode and exit the step;

(2) Frequency response measurements over the entire baseband bandwidth by varying the signal output frequency of the calibration signal generator based on the baseband sampling rate and the order of the pre-distortion filter as a frequency step;

(3) The automatic pre-distortion calibration factor generation unit calculates the filter coefficients h(n) for the conversion generation pre-distortion filter;

(4) Automatic loading into the filter to complete the frequency response amplitude correction over the entire modulation bandwidth.

Preferably, the said step (2) specifically comprises the following steps:

(2.1) Depending on the calibration bandwidth and the order of the pre-distortion filter, the calibration signal generator respectively generates two orthogonal sine and cosine calibration signals;

(2.2) The data switch switches to the relevant data channel and transmits the signal to the incoming digital-to-analog conversion module;

(2.3) The digital-to-analog conversion module generates two analog orthogonal sine and cosine signals, which are modulated by the IQ modulation module to produce a single sideband modulated signal with a suppressed carrier;

(2.4) The amplitude control module performs amplitude control and the output of the detector is converted into a digital signal by an analog-to-digital converter.

Preferably, the filter coefficient h(n) of the pre-distortion filter is calculated in the said step (3) as follows:

The filter coefficient h(n) of the pre-distortion filter is calculated according to the following equation:

$$h(n) = IFFT\left(\frac{A(n)}{D(n)}\right);$$

Where, A(n) is the output amplitude value sequence of the detector, D(n) is the frequency response data sequence of the detector, and IFFT is the Fourier inverse transform.

Using the circuit structure and method of the present invention for realizing real-time pre-distortion calibration of broadband IQ modulation, the calibration process is completed locally in real time, solving the problem of frequency response error correction caused by hardware circuit performance changes, this allows automatic pre-distortion calibration of the frequency response to be done in real time on site, thus improving the EVM of the vector signal generator. The invention can automate the whole calibration process internally, and the calibration process can be completed without any external equipment, and the calibration process is also very fast and senseless to the user. The invention is equally applicable to broadband digitally modulated RF transmitting equipment and systems, but requires an additional calibrated time response that can be used for their overhaul and maintenance.

DETAILED DESCRIPTION OF THE PREFERRED EMBODIMENT

In order to be able to understand the technical content of the present invention more clearly, is further exemplified by the following detailed description of embodiments.

The circuit structure for realizing real-time pre-distortion calibration of broadband IQ modulation is as follows:

a baseband generation module, for the calibration signal generator to generate two orthogonal sine cosine calibration signals respectively according to the calibration bandwidth and the order of the pre-distortion filter, and the data switch is switched to the relevant data channel;

a digital-to-analog conversion module, connected to the baseband generation module, for converting the signals into analog I and Q baseband signals;

a frequency synthesis module, connected to the IQ modulation module, for generating signals in a certain frequency range;

an IQ modulation module, connected to the digital-to-analog conversion module, for mixing the analog baseband signal with the local oscillator signal, and summing the output of the two mixers after combining them;

an amplitude control module, connected to the IQ modulation module and digital-to-analog conversion module, for continuous adjustment of the RF signal power.

As a preferred embodiment of the present invention, the said baseband generation module comprises:

baseband generation unit for generating two orthogonal digital I and Q path signals depending on the signal regime or type;

an automatic pre-distortion calibration factor generation unit, for processing the collected frequency response data, generating a pre-distortion calibration factor, and converting this calibration factor into an h-factor for the pre-distortion filter;

pre-distortion filter, connected to the baseband generation unit, for pre-distortion of the baseband signal, loaded in real time with an automatically generated h-factor;

a calibration signal generator, for generating a digital baseband calibration signal, and two sine and cosine digital signals orthogonal to each other;

a data switch, connected to the pre-distortion filter, for switching the calibration signal and the baseband signal into the digital-to-analog conversion module.

As a preferred embodiment of the present invention, the said digital-to-analog conversion module comprises a digital-to-analog converter and an analog-to-digital converter, the said digital-to-analog converter is connected to the data switch, and said analog-to-digital converter is connected to the automatic pre-distortion calibration factor generation unit and the amplitude control module, for digitizing the output signal of the detector and generating the frequency response error calibration factor by calculation.

As a preferred embodiment of the present invention, the said amplitude control module comprising an analog voltage controlled attenuator, an amplifier, a coupler and a digital step attenuator, the said analog voltage controlled attenuator, amplifier, coupler and digital step attenuator being connected in sequence, the said input of the analog voltage controlled attenuator being connected to the IQ modulation module;

the said amplitude control module further comprising a detector, connected to the digital-to-analog converter module, an analog voltage controlled attenuator and a coupler, for detecting amplitude information of a known signal output;

the analog voltage controlled attenuator, coupler and detector described constitute a closed-loop automatic level-controlled negative feedback, for stabilizing the power output of the signal.

This method of the present invention for real time pre-distortion calibration processing of broadband IQ modulation using the circuit structure described above, wherein it comprises the steps of:

(1) The vector signal generator path state parameters are set to change, set whether the automatic calibration is carried out by the parameters, if yes, enter the calibration mode and continue to step (2); otherwise, enter the working mode and exit the step;

(2) Frequency response measurements over the entire baseband bandwidth by varying the signal output frequency of the calibration signal generator based on the baseband sampling rate and the order of the pre-distortion filter as a frequency step;

(2.1) Depending on the calibration bandwidth and the order of the pre-distortion filter, the calibration signal generator respectively generates two orthogonal sine and cosine calibration signals;

(2.2) The data switch switches to the relevant data channel and transmits the signal to the incoming digital-to-analog conversion module;

(2.3) The digital-to-analog conversion module generates two analog orthogonal sine and cosine signals, which are modulated by the IQ modulation module to produce a single sideband modulated signal with a suppressed carrier;

(2.4) The amplitude control module performs amplitude control and the output of the detector is converted into a digital signal by an analog-to-digital converter;

(3) The automatic pre-distortion calibration factor generation unit calculates the filter coefficients h(n) for the conversion generation pre-distortion filter;

(4) Automatic loading into the filter to complete the frequency response amplitude correction over the entire modulation bandwidth.

As a preferred embodiment of the present invention, the filter coefficient h(n) of the pre-distortion filter is calculated in the said step (3) as follows:

The filter coefficient h(n) of the pre-distortion filter is calculated according to the following equation:

$$h(n) = IFFT\left(\frac{A(n)}{D(n)}\right);$$

Where, A(n) is the output amplitude value sequence of the detector, D(n) is the frequency response data sequence of the detector, and IFFT is the Fourier inverse transform.

Figure 1:
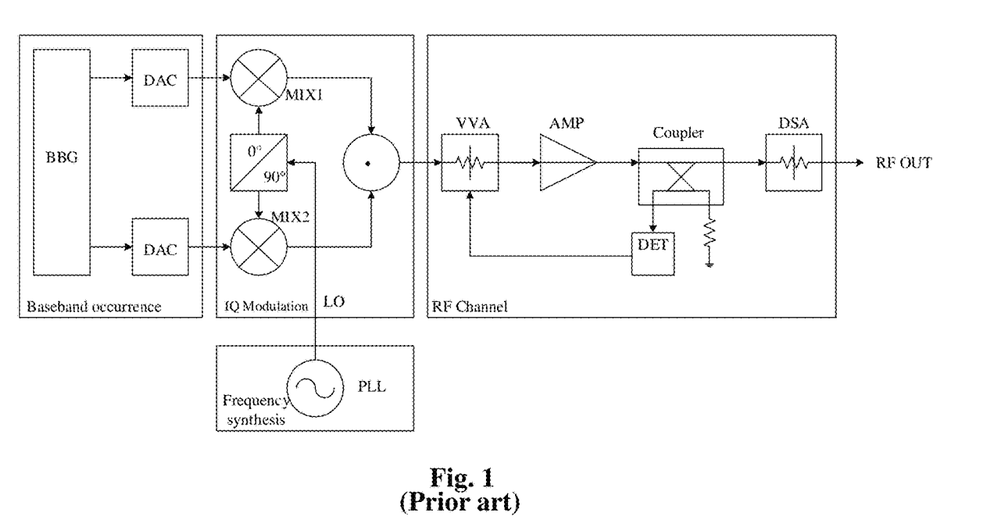
FIG. 1 shows the block diagram of the prior art vector signal generator.

In the specific implementation of the invention, a typical vector signal generator principle is shown in FIG. 1, mainly comprises baseband generation, IQ modulation, frequency synthesis and RF channels and other units, the working principle is that the Base Band Generator (BBG) generates two orthogonal digital I and Q signals according to the signal standard or type, which can be generated locally or from external data streams or files, etc., and converted to analog I and Q baseband signals through a digital-to-analog converter. The analog baseband signal enters the IQ Modulator and mixes with the local oscillator (LO) signal from the frequency synthesis unit respectively. The frequency synthesis unit generally consists of a phase-locked loop to achieve signal generation in a certain frequency range. After IQ modulation, the signal enters the RF channel, which is mainly to realize the control of signal power, including the analog voltage controlled attenuator (VVA), amplifier (AMP), coupler and digital step attenuator (DSA) inside, which can realize the continuous adjustment of RF signal power. In addition, the analog voltage-controlled attenuator, coupler and detector (DET) constitute a closed-loop automatic level control (ALC) negative feedback to stabilize the power output of the signal and improve the power fluctuations caused by environmental changes and other factors.

Figure 2:
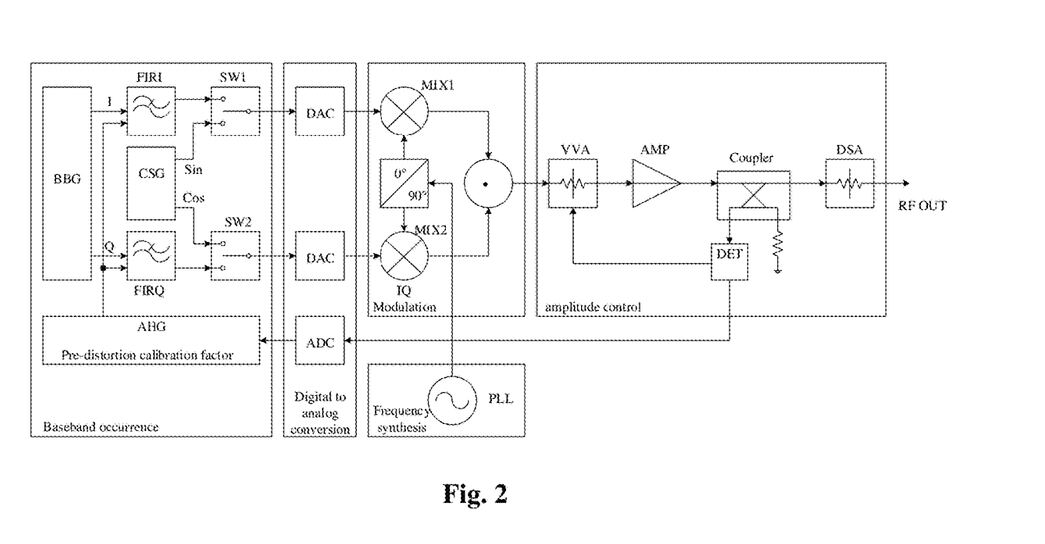
FIG. 2 shows a composition diagram of the circuit structure of the present invention for realizing real-time pre-distortion calibration of broadband IQ modulation.

FIG. 2 shows the system block diagram and connection relationship of the present invention. The working principle is that for the whole system, the frequency response variation of all components is linearly superimposed, and the final output frequency response error is the sum of the frequency response error of each unit or device. By measuring this frequency response error in real time and pre-distortion processing based on the measured frequency response error before the baseband signal is output, the frequency response error of the whole machine can be improved as a whole. In this way, a signal with known frequency and amplitude needs to be generated at the baseband end, and this signal needs to be measured to obtain the overall frequency response error. Compared to the original technical solution, the following key circuits have been added to the circuit:

Detector (DET): Used to detect the amplitude information of a known signal output. This detector can be used for automatic level control (ALC) or can be added separately in the circuit and placed as close to the output as possible, for example, after a digital step attenuator (DSA).

Analog-to-digital converter (ADC): The output signal of the detector is digitized and calculated to generate a frequency response error calibration factor.

Automatic pre-distortion calibration factor generation (AHG): a set of acquired frequency response data is processed to generate a pre-distortion calibration factor, and this calibration factor is converted into the h-factor of the pre-distortion filter.

Pre-distortion filter (FIRI/Q): By pre-distortion of the baseband signal, it is actually a set of linear-phase FIR filters, which are loadable with h-factors for real-time loading of automatically generated h-factors.

Calibration Signal Generator (CSG): Locally generated digital baseband calibration signal with known and controllable frequency and amplitude, generating two sine and cosine digital signals orthogonal to each other.

Data switches (SW1&SW2): used to switch calibration signal and baseband signal into DAC.

The method of the present invention for realizing real-time pre-distortion calibration processing for broadband IQ modulation based on the circuit structure described above, wherein the steps include the following:

After the vector signal generator's path state parameters are set to change, such as frequency, power, and modulation signal type, the parameters can be set to automatically calibrate whether or not to proceed, i.e., whether or not this calibration process is performed is settable.

If entering the calibration mode, in the baseband generation unit, according to the calibration bandwidth and the order of the pre-distortion filter, the CSG generates two orthogonal sine and cosine calibration signals respectively, and the data switch switches to the relevant data channel into the digital-to-analog converter DAC.

Figure 3:
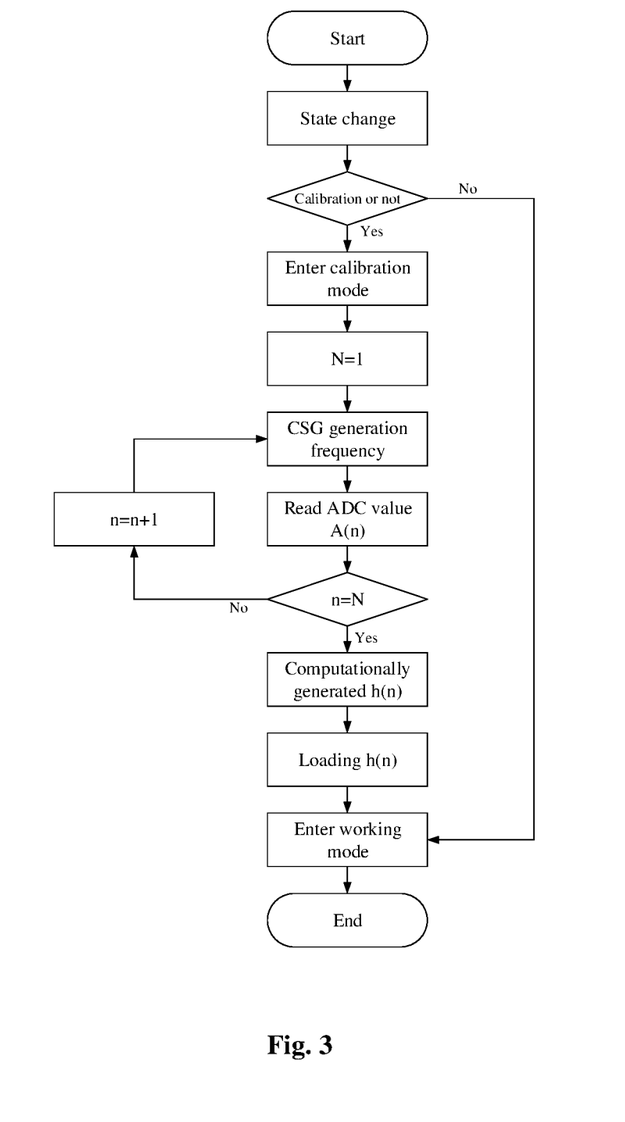
FIG. 3 shows a flow chart of the method of the present invention for realizing real-time pre-distortion calibration processing of broadband IQ modulation.

The digital-to-analog converter DAC generates two analog orthogonal sine and cosine signals, which are modulated by the IQ modulator output to produce a single sideband modulated signal with suppressed carrier (SSBSC), and then after the subsequent RF channel to complete the amplitude control, the output of the detector DET is converted into a digital signal by the analog-to-digital converter, this number reflects the signal power at the current modulation frequency, and so on repeatedly changing the signal output frequency of the CSG, the amount of frequency step is a function of the baseband sampling rate fs and the pre-distortion filter order n. Until the completion of the frequency response measurement in the whole baseband bandwidth, a set of modulated output frequency response A(n) is generated, and this set of data is calculated in the automatic pre-distortion calibration factor generation into the filter coefficient h(n) of the pre-distortion filter, and automatically loaded into the filter, so that the frequency response amplitude correction in the whole modulation bandwidth is completed. The flow chart is shown in FIG. 3.

In the process of calculating the h-factor, the frequency response error of the detector needs to be corrected, and the specific method of calculating the h-factor of the pre-distortion filter is as follows:

The calibration signal generated is:

$$I(n) = \sin\left(2\pi \frac{n}{N} f_s\right), n = 0 \sim N$$

$$Q(n) = \cos\left(2\pi \frac{n}{N} f_s\right), n = 0 \sim N$$

$$h(n) = IFFT\left(\frac{A(n)}{D(n)}\right)$$

where, $f_s$ is the sampling rate of the DAC, N is the order of the pre-distortion filter, A(n) is the output amplitude value sequence of the detector, h(n) is the h-factor of the pre-distortion filter generated by the final calculation, D(n) is the frequency response data sequence of the detector, and IFFT is the inverse Fourier transform.

Considering that there are multiple scenario switching situations in actual use, memory can be added to the baseband generation unit to store the generated matching calibration array, which can be called directly during the state transition. In addition, it is also possible to perform ADC data comparison in the background to determine whether calibration is needed when the whole machine is not output.

Using the circuit structure and method of the present invention for realizing real-time pre-distortion calibration of broadband IQ modulation, the calibration process is completed locally in real time, solving the problem of frequency response error correction caused by hardware circuit performance changes, this allows automatic pre-distortion calibration of the frequency response to be done in real time on site, thus improving the EVM of the vector signal generator. The invention can automate the whole calibration process internally, and the calibration process can be completed without any external equipment, and the calibration process is also very fast and senseless to the user. The invention is equally applicable to broadband digitally modulated RF transmitting equipment and systems, but requires an additional calibrated time response that can be used for their overhaul and maintenance.

In this specification, the present invention has been described with the reference to its specific embodiments. However, it is obvious still may be made without departing from the spirit and scope of the present invention, various modifications and transformation. Accordingly, the specification and drawings should be considered as illustrative rather than restrictive.

We claim:
1. A circuit structure for realizing real-time pre-distortion calibration of broadband in-phase/quadrature-phase (IQ) modulation, wherein the circuit structure comprises:
   a baseband generation module for a calibration signal generator to generate two orthogonal sine cosine calibration signals, respectively, according to a calibration bandwidth and an order of a pre-distortion filter, and a data switch that is switched to a relevant data channel;

a digital-to-analog conversion module connected to the baseband generation module for converting the signals into analog I and Q baseband signals;

a detector connected to the digital-to-analog conversion module;

a frequency synthesis module connected to the IQ modulation module for generating signals in a certain frequency range;

an IQ modulation module connected to the digital-to-analog conversion module for mixing the analog baseband signal with the local oscillator signal, and summing the output of the two mixers after combining them;

an amplitude control module connected to the IQ modulation module and the digital-to-analog conversion module for continuous adjustment of a radio-frequency (RF) signal power; and wherein the baseband generation module comprises:

a baseband generation unit for generating two orthogonal digital I and Q path signals depending on the signal regime or type;

a pre-distortion filter connected to the baseband generation unit for pre-distortion of the baseband signal that is loaded in real time with an automatically generated h-factor;

an automatic pre-distortion calibration factor generation unit for processing collected frequency response data, generating a pre-distortion calibration factor, and converting this calibration factor into the h-factor for the pre-distortion filter;

a calibration signal generator for generating a digital baseband calibration signal, and two sine and cosine digital signals orthogonal to each other; and wherein the pre-distortion filter is connected to the baseband generation unit for pre-distortion of the baseband signal, and is loaded in real time with the automatically generated h-factor; and wherein the data switch is connected to the pre-distortion filter for switching the calibration signal and the baseband signal into the digital-to-analog conversion module.

2. The circuit structure according to claim 1, wherein the amplitude control module comprises:

an analog voltage controlled attenuator;

an amplifier;

a coupler for detecting amplitude information of a known signal output;

a digital step attenuator; and a detector connected to the digital-to-analog converter module; and wherein the analog voltage controlled attenuator, amplifier, coupler, and digital step attenuator are connected in sequence, where an input of the analog voltage controlled attenuator is connected to the IQ modulation module; and wherein the analog voltage controlled attenuator, coupler, and detector constitute a closed-loop automatic level-controlled negative feedback, for stabilizing the power output of the signal.

3. The circuit structure according to claim 1, wherein the two orthogonal sine cosine calibration signals are calculated according to the following equations, respectively:

$$I(n) = \sin\left(2\pi \frac{n}{N} f_s\right), n = 0 \sim N$$

$$Q(n) = \cos\left(2\pi \frac{n}{N} f_s\right), n = 0 \sim N$$

where, $f_s$ is the sampling rate of the digital to analog converter (DAC), and N is the order of the pre-distortion filter.

4. The circuit structure according to claim 1, wherein the h-factor of the pre-distortion filter is calculated with the following equation:

$$h(n) = IFFT\left(\frac{A(n)}{D(n)}\right)$$

where A(n) is the output amplitude value sequence of the detector, h(n) is the h-factor of the pre-distortion filter generated by the final calculation, D(n) is the frequency response data sequence of the detector, and IFFT is the inverse Fourier transform.

5. The circuit structure according to claim 1, wherein the baseband generation unit further comprises memory that stores generated matching calibration arrays, which can be called directly during a state transition.

6. The circuit structure according to claim 5, wherein the memory allows for performance of analog digital conversion (ADC) as a background process to determine whether calibration is required.

7. The circuit structure according to claim 1, wherein pre-distortion filter is a set of linear-phase finite impulse response (FIR) filters, which are loadable with h-factors for real-time loading of automatically generated h-factors.

8. A circuit structure for realizing real-time pre-distortion calibration of broadband in-phase/quadrature-phase (IQ) modulation, wherein the circuit structure comprises:

a baseband generation module for a calibration signal generator to generate two orthogonal sine cosine calibration signals, respectively, according to a calibration bandwidth and an order of a pre-distortion filter, and a data switch that is switched to a relevant data channel;

a digital-to-analog conversion module connected to the baseband generation module for converting the signals into analog I and Q baseband signals;

a detector connected to the digital-to-analog conversion module;

a frequency synthesis module connected to the IQ modulation module for generating signals in a certain frequency range;

an IQ modulation module connected to the digital-to-analog conversion module for mixing the analog baseband signal with the local oscillator signal, and summing the output of the two mixers after combining them;

an amplitude control module connected to the IQ modulation module and the digital-to-analog conversion module for continuous adjustment of a radio-frequency (RF) signal power; and wherein the digital-to-analog conversion module comprises a digital-to-analog converter and an analog-to-digital converter, the digital-to-analog converter is connected to the data switch, and said analog-to-digital converter is connected to the automatic pre-distortion calibration factor generation unit and the amplitude control module for digitizing the output signal of the detector and generating the frequency response error calibration factor by calculation.

9. The circuit structure according to claim 8, wherein the amplitude control module comprises an analog voltage controlled attenuator, an amplifier, a coupler for detecting amplitude information of a known signal output, a digital step attenuator, and a detector connected to the digital-to-analog converter module; and wherein the analog voltage controlled attenuator, amplifier, coupler, and digital step attenuator are connected in sequence, where an input of the analog voltage controlled attenuator is connected to the IQ modulation module; and wherein the analog voltage controlled attenuator, coupler, and detector described constitute a closed-loop automatic level-controlled negative feedback, for stabilizing the power output of the signal.

10. The circuit structure according to claim 8, wherein the two orthogonal sine cosine calibration signals are calculated according to the following equations, respectively:

$$I(n) = \sin\left(2\pi \frac{n}{N} f_s\right), n = 0 \sim N$$

$$Q(n) = \cos\left(2\pi \frac{n}{N} f_s\right), n = 0 \sim N$$

where, $f_s$ is the sampling rate of the digital to analog converter (DAC), and N is the order of the pre-distortion filter.

11. The circuit structure according to claim 8, wherein the automatic pre-distortion calibration factor generation unit processes collected frequency response data, generating a pre-distortion calibration factor, and converts this calibration factor into a h-factor for the pre-distortion filter.

12. The circuit structure according to claim 11, wherein the h-factor of the pre-distortion filter is calculated with the following equation:

$$h(n) = IFFT\left(\frac{A(n)}{D(n)}\right)$$

where A(n) is the output amplitude value sequence of the detector, h(n) is the h-factor of the pre-distortion filter generated by the final calculation, D(n) is the frequency response data sequence of the detector, and IFFT is the inverse Fourier transform.

13. The circuit structure according to claim 8, wherein the baseband generation module further comprises memory that stores generated matching calibration arrays, which can be called directly during a state transition.

14. The circuit structure according to claim 13, wherein the memory allows for performance of analog digital conversion (ADC) as a background process to determine whether calibration is required.

15. The circuit structure according to claim 8, wherein pre-distortion filter is a set of linear-phase finite impulse response (FIR) filters, which are loadable with h-factors for real-time loading of automatically generated h-factors.

16. A method for realizing real-time pre-distortion calibration processing of broadband IQ modulation wherein the method comprises:

(1) providing a circuit structure for realizing real-time pre-distortion calibration of broadband IQ modulation, wherein the circuit structure comprises:

a baseband generation module for a calibration signal generator to generate two orthogonal sine cosine calibration signals, respectively, according to a calibration bandwidth and an order of a pre-distortion filter, and a data switch that is switched to a relevant data channel;

a digital-to-analog conversion module connected to the baseband generation module for converting the signals into analog I and Q baseband signals;

a frequency synthesis module connected to the IQ modulation module for generating signals in a certain frequency range;

an IQ modulation module connected to the digital-to-analog conversion module for mixing the analog baseband signal with the local oscillator signal, and summing the output of the two mixers after combining them;

an amplitude control module connected to the IQ modulation module and the digital-to-analog conversion module for continuous adjustment of a radio-frequency (RF) signal power; and wherein the baseband generation module comprises:

a baseband generation unit for generating two orthogonal digital I and Q path signals depending on the signal regime or type;

a pre-distortion filter connected to the baseband generation unit for pre-distortion of the baseband signal that is loaded in real time with an automatically generated h-factor;

an automatic pre-distortion calibration factor generation unit for processing collected frequency response data, generating a pre-distortion calibration factor, and converting this calibration factor into the h-factor for the pre-distortion filter;

a calibration signal generator for generating a digital baseband calibration signal, and two sine and cosine digital signals orthogonal to each other; and wherein the pre-distortion filter is connected to the baseband generation unit for pre-distortion of the baseband signal, and is loaded in real time with the automatically generated h-factor; and wherein the data switch is connected to the pre-distortion filter for switching the calibration signal and the baseband signal into the digital-to-analog conversion module;

(2) determining that vector signal generator path state parameters are set to change, and setting whether the automatic calibration is carried out by the parameters, if yes, enter a calibration mode and continue to step (3); otherwise, enter the working mode and exit the step;

(3) obtaining frequency response measurements over an entire baseband bandwidth by varying a signal output frequency of the calibration signal generator based on a baseband sampling rate and the order of the pre-distortion filter as a frequency step;

(4) automatically calculating in real time a set of filter coefficients h(n) for the conversion generation pre-distortion filter with the pre-distortion filter connected to the baseband generation unit; and (5) automatically loading in real time the set of filter coefficients h(n) into the pre-distortion filter to complete a frequency response amplitude correction over the entire modulation bandwidth.

17. The method according to claim 16, wherein step (3) specifically comprises the following steps:

(3.1) depending on the calibration bandwidth and the order of the pre-distortion filter, the calibration signal generator respectively generates two orthogonal sine and cosine calibration signals;

(3.2) the data switch switches to the relevant data channel and transmits the signal to the incoming digital-to-analog conversion module;

(3.3) the digital-to-analog conversion module generates two analog orthogonal sine and cosine signals, which are modulated by the IQ modulation module to produce a single sideband modulated signal with a suppressed carrier; and (3.4) the amplitude control module performs amplitude control and the output of the detector is converted into a digital signal by an analog-to-digital converter.

18. The method according to claim 16, wherein the filter coefficient h(n) of the pre-distortion filter is calculated in step (4) as follows:

the filter coefficient h(n) of the pre-distortion filter is calculated according to the following equation:

$$h(n) = IFFT\left(\frac{A(n)}{D(n)}\right);$$

where, A(n) is the output amplitude value sequence of the detector, D(n) is the frequency response data sequence of the detector, and IFFT is the Fourier inverse transform.

* * * * *

UNITED STATES PATENT AND TRADEMARK OFFICE
CERTIFICATE OF CORRECTION

| | |
|---|---|
| PATENT NO. | : 12,119,965 B2 |
| APPLICATION NO. | : 18/007774 |
| DATED | : October 15, 2024 |
| INVENTOR(S) | : Xiaolei Wang and Shuang Chen |

It is certified that error appears in the above-identified patent and that said Letters Patent is hereby corrected as shown below:

On the Title Page

Item (73) Assignee:, correct name of Assignee as follows:
(73) Assignee: Transcom (Shanghai) Technology Co., Ltd., Shanghai (CN)

Signed and Sealed this
Seventh Day of January, 2025

Derrick Brent
*Acting Director of the United States Patent and Trademark Office*